United States Patent
Schnabel et al.

(10) Patent No.: US 11,092,811 B2
(45) Date of Patent: Aug. 17, 2021

(54) TWO-PIECE HEADSET WITH AUDIO FOR AUGMENTED REALITY (AR) OR VIRTUAL REALITY (VR) OR MIXED REALITY (MR)

(71) Applicant: Dreamcraft Attractions Ltd., Victoria (CA)

(72) Inventors: Peter Schnabel, Victoria (CA); Glen Helmut Schulz, Sidney (CA); Mark Allan Stepanian, Alexandria, VA (US); Danielle Desiree Grace Flynn, Victoria (CA)

(73) Assignee: DREAMCRAFT ATTRACTIONS LTD., Victoria (CA)

( * ) Notice: Subject to any disclaimer, the term of this patent is extended or adjusted under 35 U.S.C. 154(b) by 0 days.

(21) Appl. No.: 16/850,241

(22) Filed: Apr. 16, 2020

(65) Prior Publication Data

US 2020/0241307 A1     Jul. 30, 2020

Related U.S. Application Data

(63) Continuation-in-part of application No. 15/944,628, filed on Apr. 3, 2018, now Pat. No. 10,809,535, which is a continuation of application No. 15/724,236, filed on Oct. 13, 2017, now abandoned, which is a continuation of application No. 15/083,257, filed on Mar. 28, 2016, now Pat. No. 9,933,624, and a continuation-in-part of application No. 15/057,141, filed on Mar. 1, 2016, now Pat. No. 9,778,467, application No. 16/850,241, filed on Apr.

(Continued)

(51) Int. Cl.
    *A63G 31/16*       (2006.01)
    *G02B 27/01*       (2006.01)
    *G09G 5/00*        (2006.01)
    *A63G 31/02*       (2006.01)
    *G06T 19/00*       (2011.01)

(52) U.S. Cl.
CPC ......... *G02B 27/0176* (2013.01); *A63G 31/02* (2013.01); *A63G 31/16* (2013.01); *G02B 27/0172* (2013.01); *G06T 19/006* (2013.01); *G09G 5/003* (2013.01); *G02B 2027/0138* (2013.01); *G02B 2027/0159* (2013.01)

(58) Field of Classification Search
CPC ...... A63G 31/00; A63G 31/16; G06T 19/003; G06T 19/006; G06T 15/04; A45C 1/12; G02B 27/017
USPC .................................................. 472/61, 130
See application file for complete search history.

(56) References Cited

U.S. PATENT DOCUMENTS

| | | |
|---|---|---|
| 4,048,653 A | 9/1977 | Spooner |
| 5,138,555 A | 8/1992 | Albrecht |

(Continued)

*Primary Examiner* — Kien T Nguyen
(74) *Attorney, Agent, or Firm* — Tomlinson McKinstry, P.C.

(57) ABSTRACT

A two-piece headset with audio for AR (Augmented Reality)/VR (Virtual Reality)/MR (Mixed Reality), including a headpiece that is readily cleaned and disinfected, that in use releasably couples with an audio-visual component, so as to avoid physical contact between the audio-visual component and the user's head, and featuring automatic disengagement of headphones on decoupling of the headpiece and audio-visual component. An amusement attraction using two-piece headset with audio and having a support and retraction assembly for the audio-visual component.

13 Claims, 12 Drawing Sheets

Related U.S. Application Data

16, 2020, which is a continuation-in-part of application No. 15/083,274, filed on Mar. 28, 2016, which is a continuation-in-part of application No. 15/057,141, filed on Mar. 1, 2016, now Pat. No. 9,778,467, and a continuation-in-part of application No. 15/083,257, filed on Mar. 28, 2016, now Pat. No. 9,933,624.

(60) Provisional application No. 62/834,584, filed on Apr. 16, 2019, provisional application No. 62/948,067, filed on Dec. 13, 2019.

(56) References Cited

U.S. PATENT DOCUMENTS

| | | |
|---|---|---|
| 5,490,784 A | 2/1996 | Carmein |
| 6,798,493 B2 | 9/2004 | Imanishi |
| 8,241,038 B2 | 8/2012 | Quinn et al. |
| 2014/0333773 A1* | 11/2014 | Davis ............... G06F 1/163 |
| | | 348/158 |
| 2015/0363976 A1 | 12/2015 | Henson |
| 2016/0063767 A1 | 3/2016 | Lee et al. |
| 2016/0249124 A1* | 8/2016 | Drinkwater ........... H04R 1/105 |
| 2016/0363773 A1* | 12/2016 | Tempel ............. G02B 27/0176 |

* cited by examiner

TWO-PIECE HEADSET WITH AUDIO FOR AUGMENTED REALITY (AR) OR VIRTUAL REALITY (VR) OR MIXED REALITY (MR)

CROSS REFERENCE TO RELATED APPLICATIONS

This application is a continuation-in-part of U.S. patent application Ser. No. 15/944,628 filed Apr. 3, 2018, which is a continuation of U.S. Ser. No. 15/724,236, filed Oct. 3, 2017, which is a continuation of U.S. Ser. No. 15/083,257 filed Mar. 28, 2016 (now U.S. Pat. No. 9,933,624 issued Apr. 3, 2018) and a continuation-in-part of U.S. Ser. No. 15/057,141, filed Mar. 1, 2016 (now U.S. Pat. No. 9,778,467, issued Oct. 3, 2017). This application is also a continuation-in-part of U.S. Ser. No. 15/083,274 filed Mar. 28, 2016 which is a continuation-in-part of U.S. Ser. No. 15/057,141 filed Mar. 1, 2016 (now U.S. Pat. No. 9,778,467 issued Oct. 3, 2017) and is also a continuation-in-part of U.S. Ser. No. 15/083,257 filed Mar. 28, 2016 (now U.S. Pat. No. 9,933,624 issued Apr. 3, 2018). This application also claims the benefit of U.S. 62/834,584 (filed 16 Apr. 2019) and U.S. 62/948,067 (filed 13 Dec. 2019).

FIELD OF THE INVENTION

The present invention relates generally to virtual reality audio-visual headsets, such as for use in amusement/theme park attractions.

BACKGROUND OF THE INVENTION

Various amusement attractions have been developed using Virtual Reality (VR) technology allowing patrons to view and interact with a virtual environment. Typical systems in existence consist of a VR headgear system and a motion base. Conventional VR headgear uses a screen permanently housed within an enclosure worn by a guest.

SUMMARY OF THE INVENTION

In one aspect, the present invention provides a two-piece headset with audio for AR (Augmented Reality)/VR (Virtual Reality)/MR (Mixed Reality), providing reliable easy-to-use audio integration.

In another aspect, the present invention provides a two-piece headset comprising an audio visual component that in use is releasably coupled (e.g., by magnetic attraction, releasable mechanical fasteners etc.) to a headpiece. In use the viewing screen does not contact the user's head. As compared to the audio visual component, the headpiece is relatively simple and low-cost, and does not include any electrical components associated with the VR experience. Separating the audio visual component from the headpiece, allows for continued use of the audio visual component with a sequence of headpieces (which may be cleaned and disinfected when not in use). The severable headset increases the theoretical hourly capacity of an amusement park ride featuring virtual reality provided individually to riders.

In another aspect, the present invention provides a headset assembly for providing individualized video and audio to a user, the headset assembly including: a headpiece having: a view opening, a left ear guard and a right ear guard, wherein when the headpiece is in an operational position on the user's head, the view opening is at the user's eyes, the left ear guard is adjacent to the user's left ear and the right ear guard is adjacent to the user's right ear; an audio-visual component configured for interconnection with a video source and an audio source, and having a video display; a left audio speaker and a right audio speaker supported by the audio-visual component; a coupling means for releasably coupling the headpiece and audio-visual component, wherein when the headpiece and audio-visual component are so coupled: the view opening is adjacent the video display; the left audio speaker is reversibly movable between a left engaged position in which the left audio speaker is adjacent the left ear guard, and a left disengaged position in which the left audio speaker is laterally displaced from the left ear guard; the right audio speaker is reversibly movable between a right engaged position in which the right audio speaker is adjacent the right ear guard, and a right disengaged position in which the right audio speaker is substantially laterally displaced from the right ear guard; and wherein, when the the headpiece and audio-visual component are so coupled and the left audio speaker is in the left engaged position and the right audio speaker is in the right engaged position, substantially anterior movement of the audio-visual component relative to the headpiece so as to decouple one from the other, causes the audio speakers to move to the disengaged positions.

The engaged position may be releasably maintained by a magnetic force of attraction between the audio speaker and the adjacent ear guard; and the substantially anterior movement of the audio-visual component relative to the headpiece may weaken the magnetic force of attraction.

Associated with each audio speaker there may be a biasing means tending to cause the audio speaker to move to the disengaged position wherein the biasing means is insufficient to cause the audio speaker to move from the engaged position when the headpiece and audio-visual component are coupled.

The support of each of the left audio speaker and the right audio speaker by the audio-visual component may be provided by: a headphone arm having a proximal end and a distal end; a pivot mount, pivotally mounting the proximal end to the audio-visual component; and a headphone mount supporting the audio speaker at the distal end; and the biasing means may be a spring assembly engaging the proximal end and the pivot mount.

The headpiece may include two posterior facing sloped shoulders, one sloped shoulder anterior the left ear guard and the other sloped shoulder anterior the right ear guard, for assisting each audio speaker to move to the disengaged position under the substantially anterior movement of the audio-visual component relative to the headpiece so as to decouple one from the other. Each posterior facing sloped shoulder may be concave in profile.

The coupling means for releasably coupling the headpiece and audio-visual component may include mating magnetic components. The mating magnetic components may be headpiece right, left and forehead magnets; and audio-visual component right, left and forehead magnets.

The audio-visual component may include: a head-mounted display device having the video display; and an adapter to which the head-mounted display device is secured, wherein, the support of each of the left audio speaker and the right audio speaker by the audio-visual component may be provided by: a headphone arm having a proximal end and a distal end; a pivot mount, pivotally mounting the proximal end to the adapter; and a headphone mount supporting the audio speaker at the distal end.

The adapter may include an adapter body and a clamshell component, and the head-mounted display device may be secured between the adapter body and the clamshell component.

In another aspect, the present invention provides an amusement attraction involving providing individualized video and audio to a user, the amusement attraction including: a headpiece having: a view opening, a left ear guard and a right ear guard, wherein when the headpiece is in an operational position on the user's head, the view opening is at the user's eyes, the left ear guard is adjacent to the user's left ear and the right ear guard is adjacent to the user's right ear; an audio-visual component configured for interconnection with a video source and an audio source, and having a video display; a left audio speaker and a right audio speaker supported by the audio-visual component; a coupling means for releasably coupling the headpiece and audio-visual component, wherein when the headpiece and audio-visual component are so coupled: the view opening is adjacent the video display; the left audio speaker is reversibly movable between a left engaged position in which the left audio speaker is adjacent the left ear guard, and a left disengaged position in which the left audio speaker is laterally displaced from the left ear guard; the right audio speaker is reversibly movable between a right engaged position in which the right audio speaker is adjacent the right ear guard, and a right disengaged position in which the right audio speaker is substantially laterally displaced from the right ear guard; and wherein, when the the headpiece and audio-visual component are so coupled and the left audio speaker is in the left engaged position and the right audio speaker is in the right engaged position, substantially anterior movement of the audio-visual component relative to the headpiece so as to decouple one from the other, causes the audio speakers to move to the disengaged positions; a motion base, comprising a hanger, configured to support the audio-visual component over the user's head; and wherein the audio-visual component is tethered to the hanger.

The motion base may include a restraint system. The motion base may include a control input and a plurality of actuators.

DETAILED DESCRIPTION WITH REFERENCE TO THE DRAWINGS

At times herein, AR is used to refer to Augmented Reality; VR is used to refer to Virtual Reality; MR is used to refer to Mixed Reality; dorsal is used to refer to posterior or rearward directions; ventral is used to refer to anterior or forward directions; medial is used to refer to towards the middle; and lateral is used to refer to towards the side.

As shown in the drawings, an exemplary headset 100 embodiment of the present invention includes an audio-visual component 102 and a headpiece 104, for use by a user 105. For clarity, in the drawings showing the headset 100, the cabling (which is conventional) is not shown.

In the exemplary embodiment shown in the drawings, the audio-visual component 102 includes an adapter 106 and a head-mounted display 108.

In the exemplary embodiment shown in the drawings, the head-mounted display 108 is an HTC VIVE™ display. The head-mounted display 108 includes a display body 110, two view screens 112, a connection interface 114 (for connecting the head-mounted display 102 to a visual and audio data feed), and display mount engagement projections 116.

The adapter 104 includes an adapter body 140, a clamshell 142, a left headphone assembly 144, a right headphone assembly 146, and a hook loop 148.

The adapter body 140 includes an adapter body view opening 160, display mount engagement receptacles 162 (for receiving the display mount engagement projections 116), a clamshell mount 164 with clamshell mount screw receiving threaded bores 166, a left headphone assembly mount 168, a right headphone assembly mount 170, a left adapter magnetic anchor 172, a right adapter magnetic anchor 174, and a forehead adapter magnetic anchor 176. Each headphone assembly mount 168, 170 includes a hook loop groove 178, for mounting the hook loop 148 on either side of the adapter body 140. In the drawings the hook loop 148 is shown as projecting laterally from the adapter body 140, but to be clear, the engagement between the hook loop groove 178 and hook loop 148 is such that the hook loop 148 is pivotal within the hook loop groove 178 roughly 180 degrees, i.e., between projecting substantially ventrally and projecting substantially dorsally.

The clamshell 142 includes two screw holes 190 and, optionally, a tether coupling 192. As shown in the drawings, in use, the display body 110 is releasably secured to the adapter body 140 by interposing the display body 110 between the adapter body 140 and the clamshell 142, and affixing the clamshell 142 to the adapter body 140 by inserting the clamshell mount screws 194 through the screw holes 190 into the clamshell mount screw receiving threaded bores 166. The joint between the adapter body 140 and the clamshell 142 defines a cable opening 196 that in use is fitted with a cable-protecting rubber grommet 198. The clamshell 142 also houses a custom PCB (Printed Circuit Board) for interconnecting the audio-visual component 102 to other components and to a data feed.

Each headphone assembly 144,146 includes: a pivot base 200 (configured to be mounted to a respective headphone assembly mount 168,170); a headphone arm 202; a hinge pin 204 passing through the pivot base 200 and the proximal end of the headphone arm 202; and a speaker body 206 mounted at the distal end of the headphone arm 202.

Figure 1:
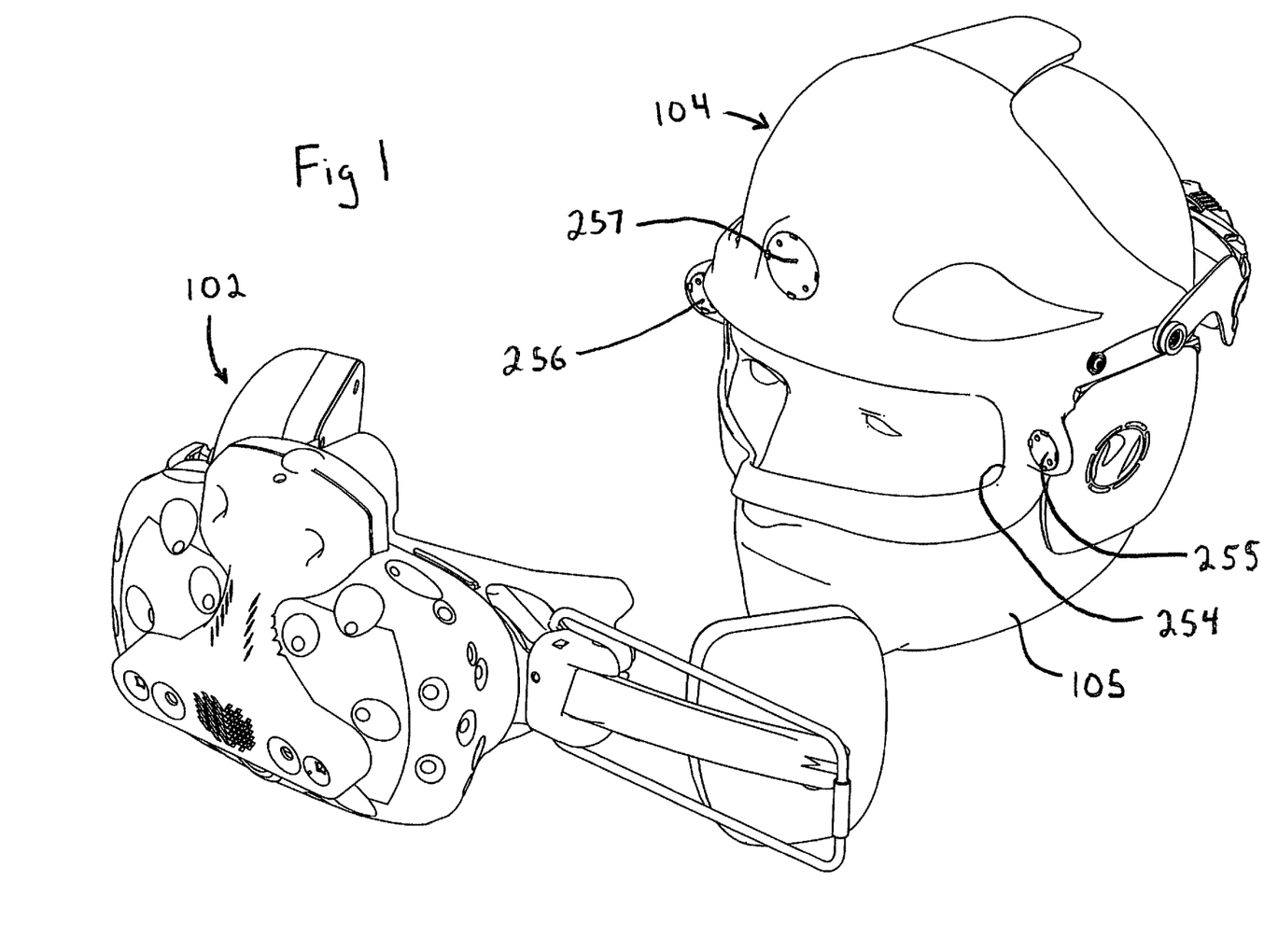
FIG. 1 is a perspective view of a headset embodiment of the present invention, shown with the headpiece on a user's head and the audio-visual component disengaged from the headpiece.
Figure 2:
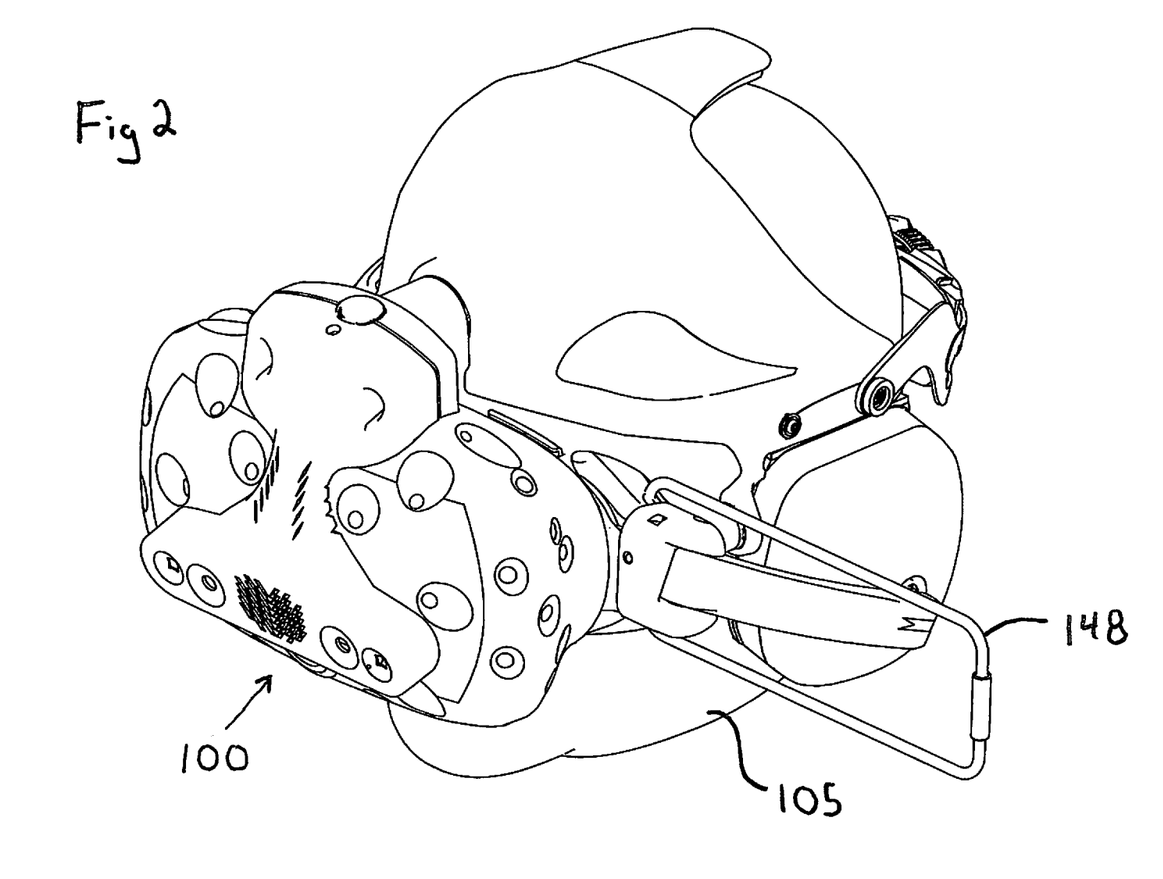
FIG. 2 is a perspective view of the embodiment of FIG. 1, shown with the headpiece on a user's head and the audio-visual component engaged with the headpiece.
Figure 3:
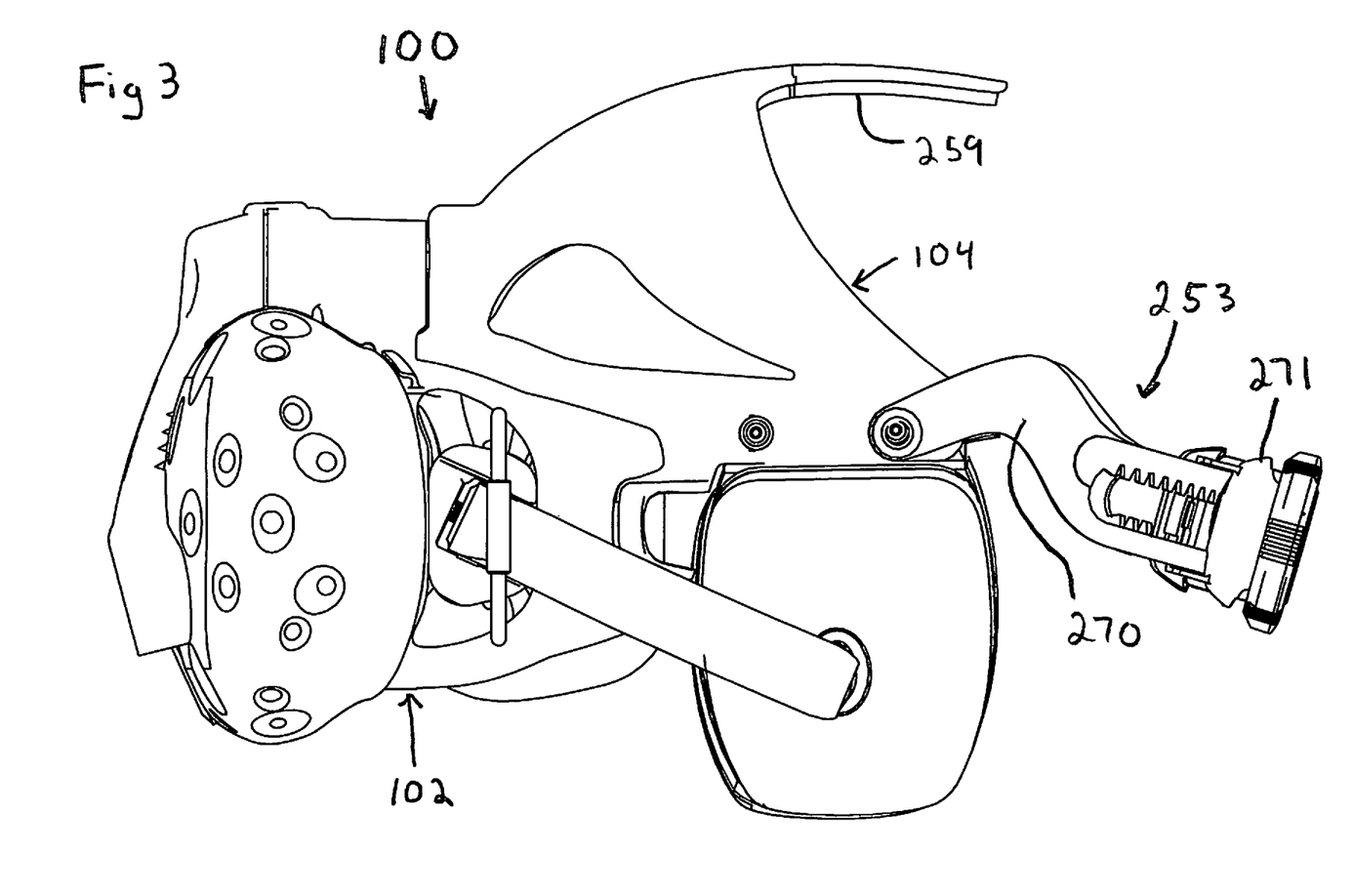
FIG. 3 is side elevation view of the embodiment of FIG. 1 invention, shown with the audio-visual component engaged with the headpiece.
Figure 4:
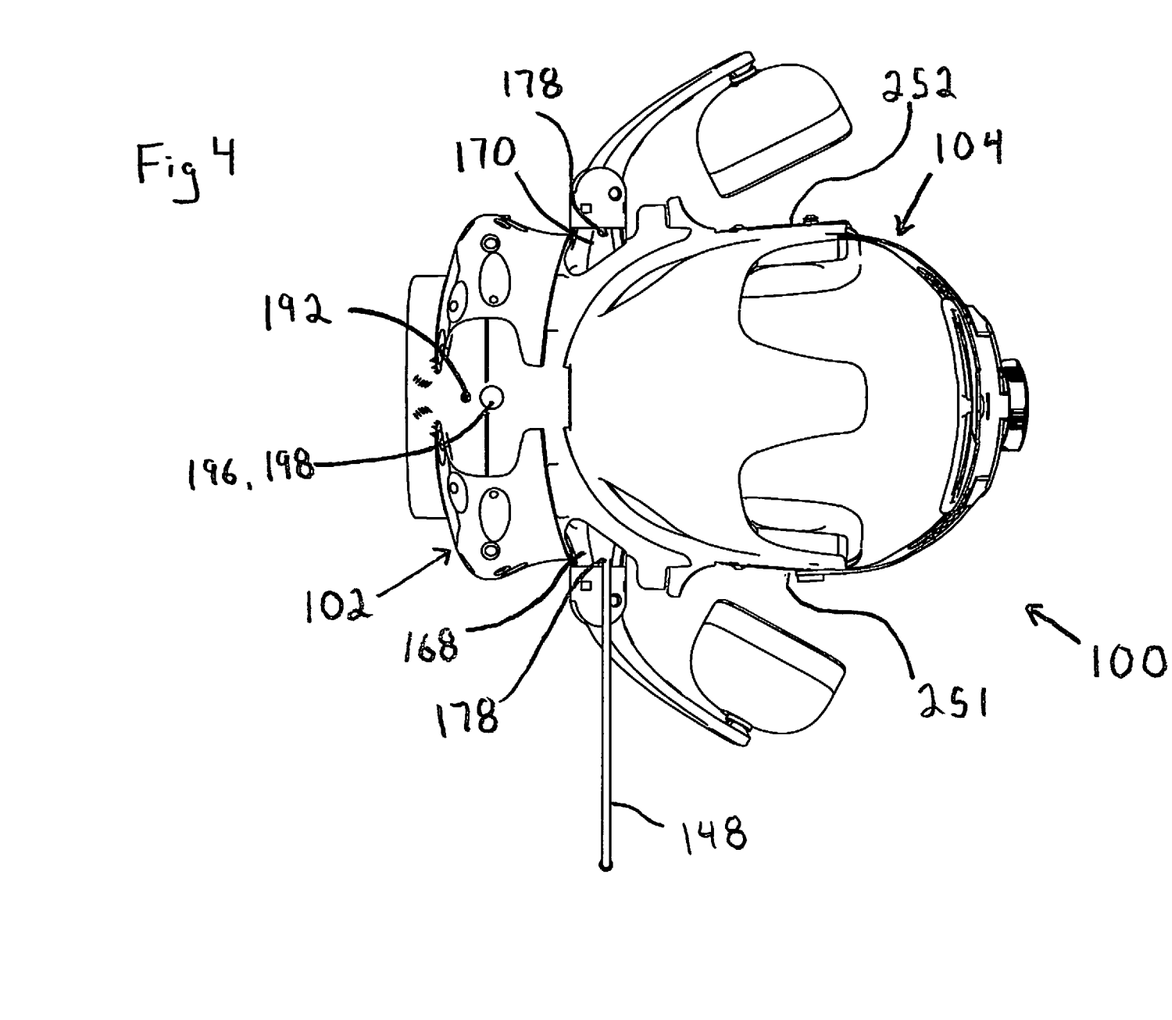
FIG. 4 is a top plan view of the headset embodiment as shown in FIG. 3, shown with the headphone arms in the open position.
Figure 5:
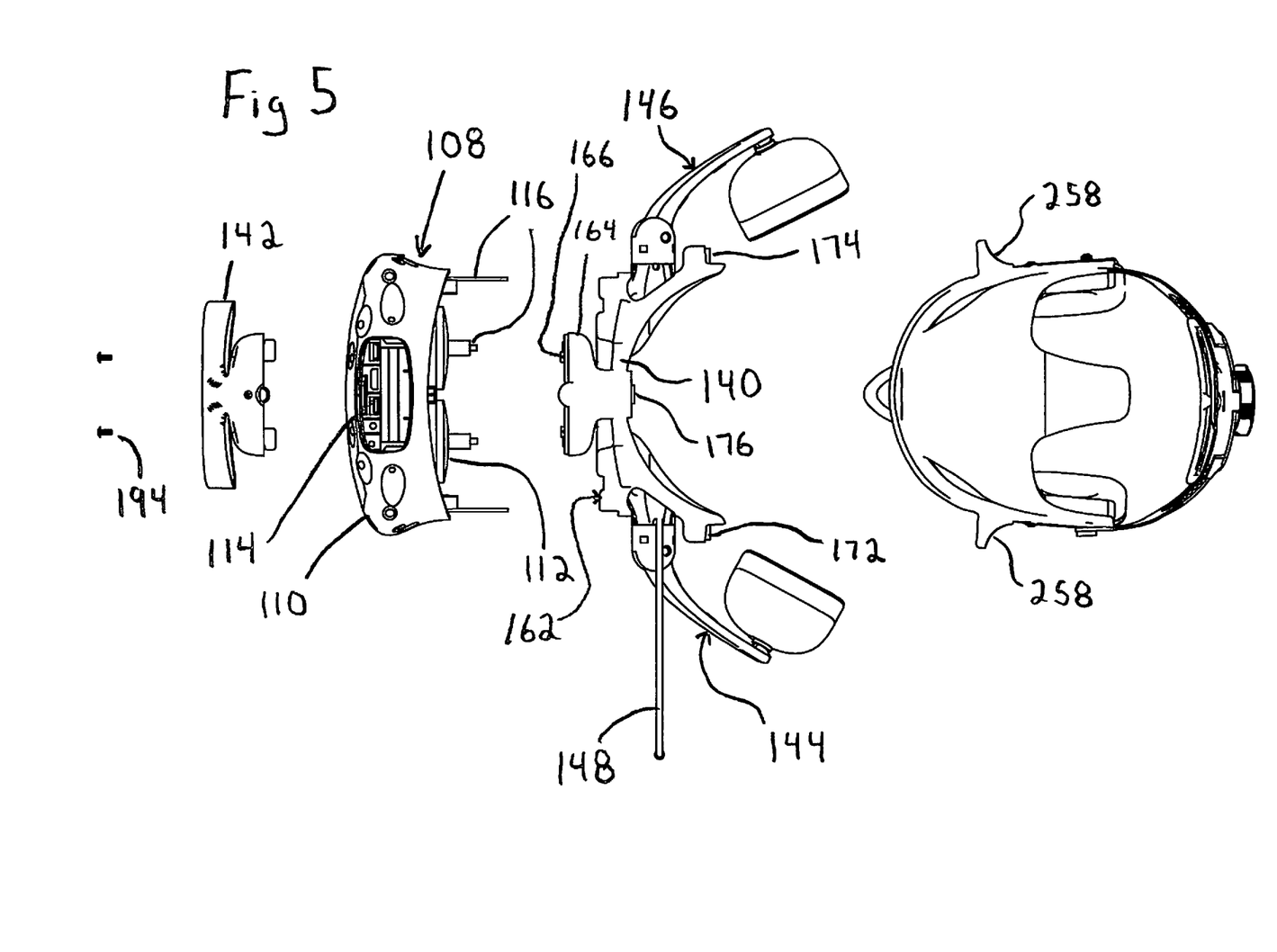
FIG. 5 is a top plan partially exploded view of the headset embodiment as shown in FIG. 4.
Figure 6:
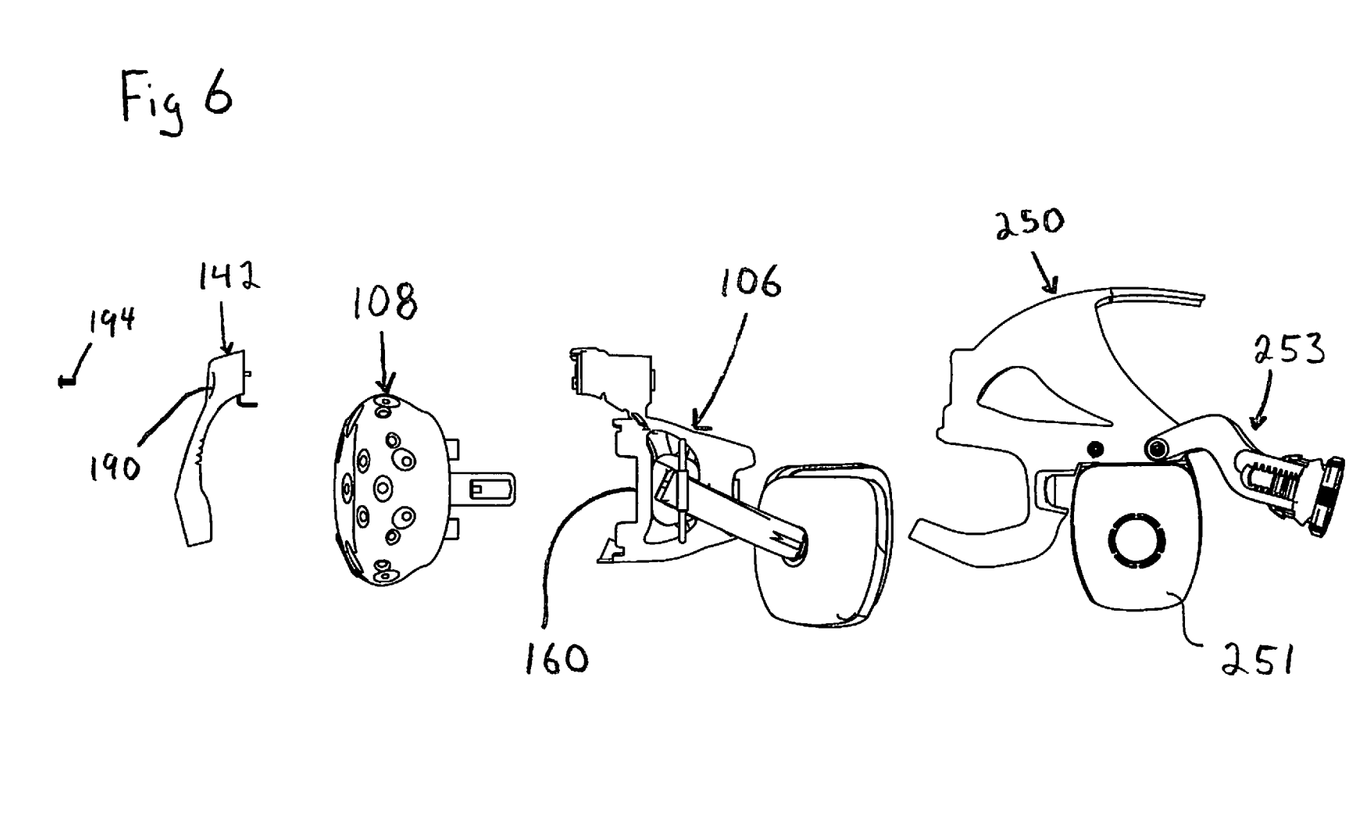
FIG. 6 is a side elevation partially exploded view of the headset embodiment as shown in FIG. 5.
Figure 7:
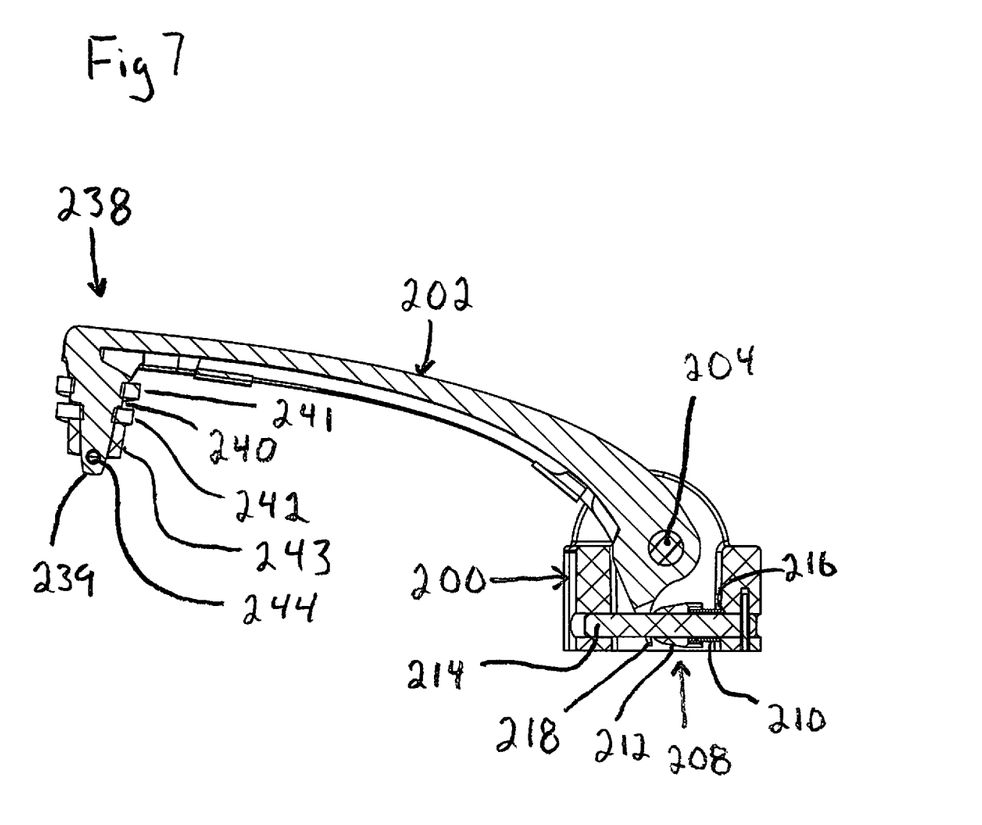
FIG. 7 is a sectional view of a pivot base and headphone arm of the embodiment of FIG. 1.

The pivot base 200 includes a spring assembly 208 for resiliently biasing headphone arm 202 towards an open disengaged position. The spring assembly 208 includes a coil spring 210 and a spring follower 212 both: slidably mounted on a spring follower rod 214, and interposed between a spring seat 216 and a headphone arm fork 218.

Figure 8:
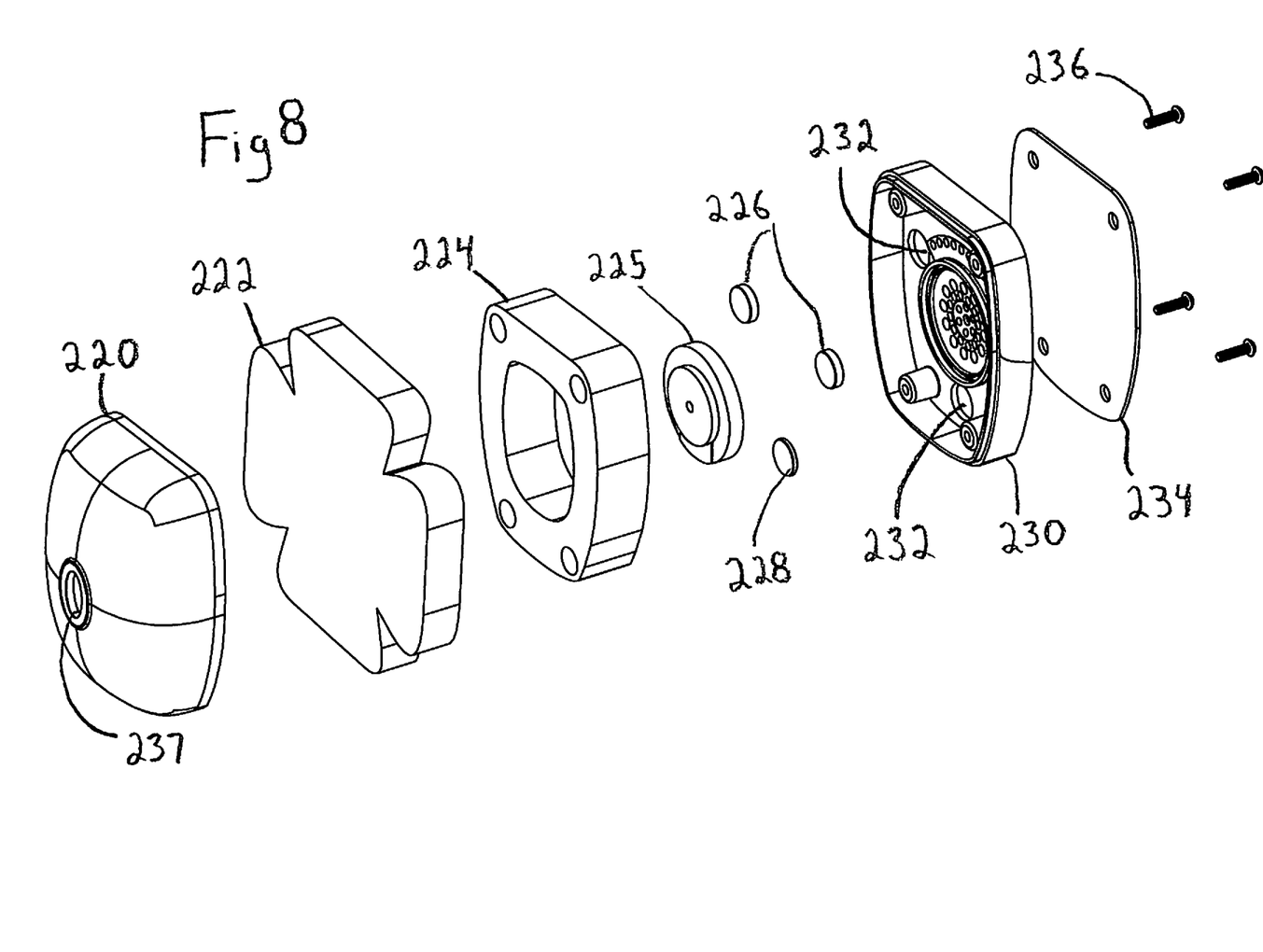
FIG. 8 is an exploded perspective view of a speaker body of the embodiment of FIG. 1.

The speaker body 206 includes: a speaker cup 220, an outer foam profile 222; an inner foam profile 224, a speaker 225 (in the exemplary embodiment shown in the drawings, a 925-XDC 16 NL22 40 mm Speaker Driver); two upper speaker magnets 226 (in the exemplary embodiment shown in the drawings, each is a neodymium magnet, ½" diameter and ⅛" thick N52); a lower speaker magnet 228 (in the exemplary embodiment shown in the drawings, a 925 neodymium magnet, ½" diameter and 1/16" thick N52); an ear cup face plate 230 having three speaker magnet seats 232 (in which the speaker magnets 226,228 are secured, e.g., with an adhesive such as epoxy); an ear guard felt 234 (affixed to the ear cup face plate 230 with an adhesive, e.g., a peel and stick adhesive); and four speaker screws 236 (for attaching the ear cup face plate 230 and speaker cup 220 together).

The speaker cup 220 includes an oval cup opening 237. The distal end of the headphone arm 202 includes a speaker cup mount 238 comprising: a speaker cup mount projection 239 including an oval shoulder 240 configured for a loose fit within the oval cup opening 238; an outer rubber washer 241 (for abutting the exterior of the speaker cup 220); an inner rubber washer 242 (for abutting the interior of the speaker cup 220); a collar 243; and a collar retainer pin 244. The oval cup opening 237 and speaker cup mount 238 cooperate to provide a desired flexibility between the headphone arm 202 and speaker body 206 (in the embodiment shown in the Figures, each speaker box is flexibly attached to the headphone arm in a manner permitting some relative rotation and pivoting of the headphone relative to the headphone arm, but such flexible mounting is not present in all embodiments).

The headpiece 104 includes a headpiece body 250; a left ear guard 251; a right ear guard 252; and an adjustable strap 253.

The headpiece body 250 includes; a headpiece view opening 254; a left headpiece magnetic anchor 255; a right headpiece magnetic anchor 256; and a forehead headpiece magnetic anchor 257. Each of the left headpiece magnetic anchor 255 and the right headpiece magnetic anchor 256 has a dorsal facing concave shoulder 258. A headpiece pad assembly 259 (comprising cushioning padding foam that preferably has anti-bacterial attributes) is affixed to the interior of the headpiece body 250.

Figure 9:
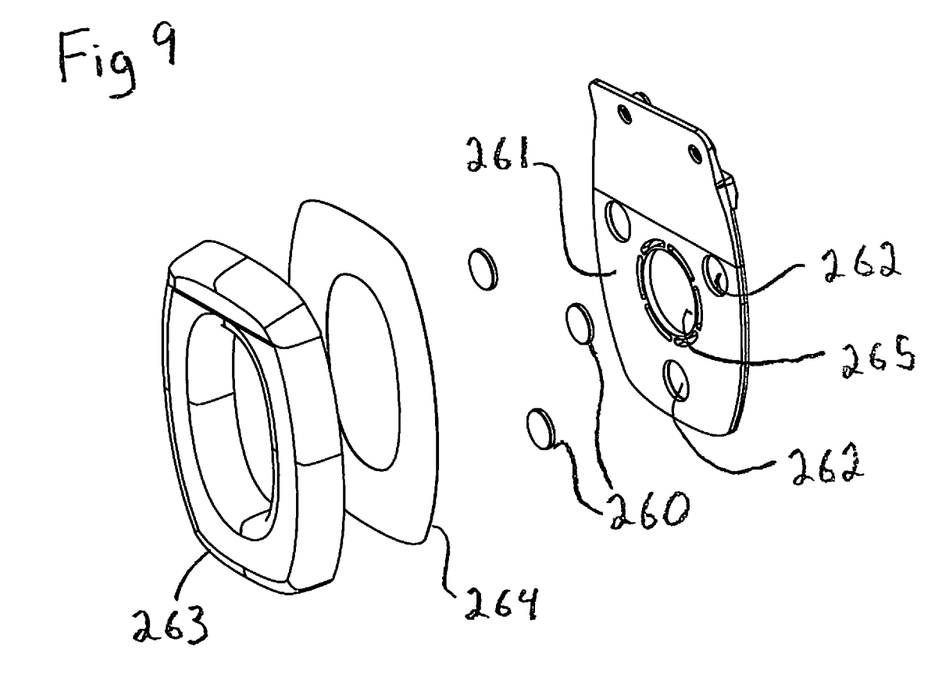
FIG. 9 is an exploded perspective view of an ear guard of the embodiment of FIG. 1.
Figure 10:
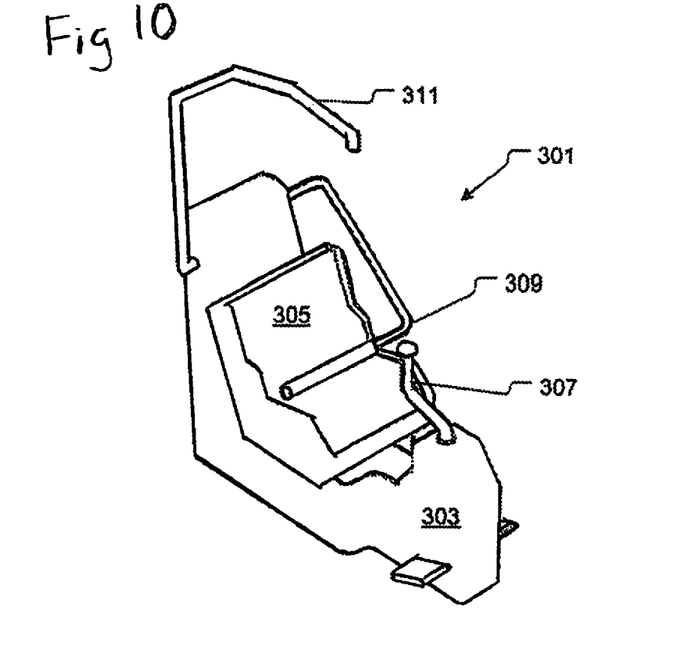
FIG. 10 is a perspective view of a schematic representation of a motion base assembly embodiment of the present invention.
Figure 11:
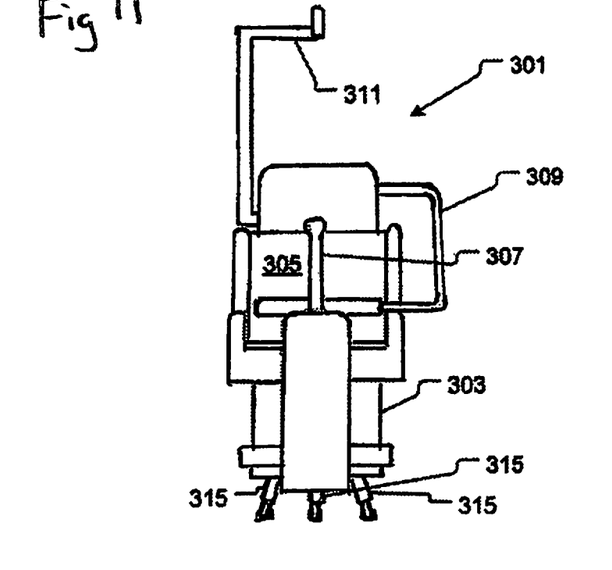
FIG. 11 is a front elevation view of a schematic representation of the motion base assembly embodiment of FIG. 10.

The ear guards 251, 252 are positioned so that each ear guard 251, 252 overlies a user's ear when the headpiece 104 is in position on the user's head. The ear guards 251, 252 are intended to provide a physical, but sound transmitting, barrier, between the user's ears and the speaker bodies 206, so as to maintain a satisfactory sanitary state for the speaker bodies 206 for multiple sequential users. Each ear guard 251, 252 includes three ear guard magnets 260 (in the exemplary embodiment shown in the drawings, each is a 925 neodymium magnet, ½" diameter and 1/16" thick N52), an ear guard plate 261 having three ear guard magnet seats 262 (in which the ear guard magnets 260 are secured, e.g., with an adhesive such as epoxy); an ear muff 263 (comprising a pliable foam material to provide a soft comfortable surface and a form of sound isolation/seal); and an ear muff transfer tape 264 (for affixing the ear muff 263 to the ear guard plate 261).

In the exemplary embodiment shown in the drawings, each ear guard 251, 252 is attached to a respective side of the headpiece body 250 with conventional fasteners (e.g., screws). Each ear guard 251, 252 has a sound conducting ear guard hole 265 (in the exemplary embodiment, having a diameter of 28 mm). Each ear guard 251, 252, is configured so as to have an inward cant of about 15 degrees to accommodate the "spread" occasioned by users with large heads while providing desired proximity to the ears of users with smaller heads.

The adjustable strap 253 is attached to each side of the headpiece body 250 and includes a dog-leg portion 270 on each side (to accommodate the speaker bodies 206 and to allow the adjustable strap to be at the desired position on the user's head) and a user operable releasable tensioning device 271 with a ratcheting knob. The adjustable strap 253 is attached to the headpiece body 250 by means of fasteners so as to permit pivotal movement of the adjustable strap 253 relative to the headpiece body 250 as desired by the user when adjusting the adjustable strap 253. In use, the adjustable strap 253 is preferably positioned under, or adjacent to, the user's occipital bone and tightened with the ratcheting knob until comfortably snug.

Use of the headset 100 involves: the user being provided with the headpiece 104 and securing it on their head with the ratchet knob as outlined above, with the user's ears adjacent the ear muffs 263; the headpiece 104 equipped user being brought into the vicinity of the audio-visual component 102 or the audio-visual component 102 being brought into the vicinity of the headpiece 104 equipped user, as the case may be; the user 105 bringing the audio-visual component 102 into contact with the ventral portion of the headpiece 104 so as to engage the left adapter magnetic anchor 172, right adapter magnetic anchor 174, and forehead adapter magnetic anchor 176, with the left headpiece magnetic anchor 255, right headpiece magnetic anchor 256, and forehead headpiece magnetic anchor 257, so as to releasably couple the audio-visual component 102 to the headpiece 104; the user 105 moving each headphone arm 202 and speaker body 206, medially so as to bring the respective speaker magnets 226, 228 into engagement with the respective ear guard magnets 260, so as to releasably secure the speaker bodies 206 to the ear guards 251, 252 (in that the magnetic attraction of engaged magnets overcomes the resiliently biasing of the headphone arm 202 laterally towards the open disengaged position); the user undergoing the audio-visual experience provided by the headset 100; the user grasping the audio-visual component 102 to decouple it from the headpiece 104 wherein the resulting misalignment of the speaker magnets 226, 228 and ear guard magnets 260, along with physical interaction between each speaker body 206 and adjacent concave shoulder 258, enables the resiliently biasing of the headphone arms 202 to move the speaker bodies 206 laterally towards the open disengaged positions; and then the user may remove the headpiece 104.

To be clear, the user may directly manually move each headphone arm 202 and speaker body 206 laterally so as to disengage each speaker body 206 from the associated ear guard 251, 252 and enable the resiliently biasing of the headphone arms 202 to move the speaker bodies 206 laterally towards the open disengaged positions.

In use, the ear guard felt 234 functions to reduce sound transmission between the ear cup face plate 230 and the respective ear guard 251, 252, which along with the ear muff 263, outer foam profile 222 and inner foam profile 224, provides desirable sound isolation for the user.

The headpiece 104 and adapter 106 preferably comprise molded plastic components. The headpiece 104 is resiliently flexible so as to accommodate differences between user's heads in terms of the size and shape. The hinging/pivoting of the headphone arms 202 and speaker bodies 206 relative to the adapter body 140 accommodates distortions (i.e., differences in the shape) of the headpiece resulting from differences in users' heads.

The interface between the adapter 106 and the headpiece 104, and the engagement of the speaker bodies 206 and the ear guards 251, 252, may be configured such that each adaptor 106 may be used with a plurality of different sizes of headpieces (so as to accommodate users of different sizes/ages). The hinging/pivoting of the headphone arms 202 relative to the adapter body 140 facilitates such use with headpieces of different sizes.

Amusement park attractions featuring head mounted display with removable screens allow for operators to provide individualized virtual reality environments to each and every rider. Each rider can have a unique virtual experience as they look around in the virtual environment and are moved corresponding with the virtual environment. The ride comprises a motion base, a tethered head mounted display, a lap bar, display hanger, and a control input. The motion base typically comprises a chair mounted to a plurality of linear actuators for moving the chair in the virtual environment. The display hanger is rotationally attached to the motion base and moves the tethered head mounted display towards and away from the user as needed. The lap bar is rotationally attached to the motion base and prevents riders from leaving the attraction until the ride is over. Additionally, the lap bar is geared to the display hanger such that when the lap bar is located in the user's lap an end of the display hanger is directly over their head. Alternatively, when the lap bar is over their head, the end of the display hanger is located behind the user's head. Control input is a joystick to allow the user to move the motion base and therefor themselves in the virtual environment. Alternatively a front facing camera located on the tethered head mounted display can track the user's hands to provide input into the virtual environment. For example, the user can steer a virtual steering wheel by placing their hands in front of them and rotating them around the virtual steering wheel.

An exemplary virtual reality compatible motion base 301 is shown in FIGS. 10-13. Motion base 301 includes: a base 303, a chair 305 supported by the base 303, an input system 307, a restraint system 309, an audio-visual component support system 311, and a plurality of actuators 315. The input system 307 shown in the drawings comprises a motion sensing joystick configured to allow a user to provide input into the virtual reality environment. It should be apparent that chair 305 could be a wheelchair or motorized scooter releasably affixed to a substantially planar base.

The plurality of actuators 315 preferably consist of a first actuator, a second actuator, and a third actuator. While linear actuators are illustrated, it should be apparent that the motion base actuators could have other mechanical outputs such as rotary actuators and oscillatory actuators. The actuators 315 are spaced apart in a tripod configuration wherein the first actuator is located near a front of the motion base 301, and the second and third actuators are located near a rear of the motion base 301. The plurality of actuators 315 are configured to move the motion base 301 responsive to the controller and the input system 307. For example, the controller may move the motion base 301 as if the user 105 is on a boat riding down a series of rapids, the user can select which fork of the river to ride down by moving the input system.

Restraint system 309 includes a lap bar rigidly attached to a C shaped member. Audio-visual component support system 311 includes an extended member configured to support a virtual reality headset over the user. Audio-visual component support system 311 also includes a retraction system to adjust a length of the tether to the audio-visual component 102.

Preferably, both the restraint system 309 and the audio-visual component support system 311 pivot about the user 105. Restraint system 309 is rotationally coupled to the audio-visual component system 311, for example, by a gearing system located in the motion base 301. The gearing system preferably has a 2:1 gearing ratio however other ratios are contemplated by this application. The gearing system is geared such that the VR support system rotationally moves half as much as the restraint system. This gearing system allows the restraint system to pivot up and out of the way of the user while moving the VR headset back and away from the user. This allows the user to get into and out of the chair 305 easily and quickly.

The lap bar as illustrated increases throughput of the attraction however other restraint systems are contemplated by this application. Certain types of virtual reality embodiments may have restraint systems simulating restraint systems consistent with the ride experience. For example, a restraint system may comprise a five point harness for a system configured as a flight simulator, wherein a portion of the harness is coupled to the gearing system such that securing the harness moves the audio-visual component support system 311 closer to the user. Alternatively, the five point harness may not adjust the location of the audio-visual component support system 311. Other types of restraints are contemplated by this application such as seatbelts, over the shoulder restraints, locking lap bars, T-bars.

While the audio-visual component support system 311 is illustrated as being directly attached to the motion base 301, it should be apparent that the audio-visual component support system 311 may be located remotely to the motion base 301. For example, the audio-visual component support system 311 may be mounted to a wall or ceiling located near the motion base 301.

In exemplary embodiment shown in the drawings, the audio-visual component 102 is tethered to the audio-visual component support system 311 to prevent removal and provide data and power to the audio-visual component 102. Other embodiments may include retraction system to move the audio-visual component 102 close to and away from the user. For example, a hanger may located above the motion base 301 with the hanger configured to lower the tethered audio-visual component 102 to the vicinity of the user's lap. Alternatively, the audio-visual component 102 may be suspended near the user's head, or may rest in an adjacent basket or hang on an adjacent hook, until user coupled to the headpiece 104.

Figure 12:
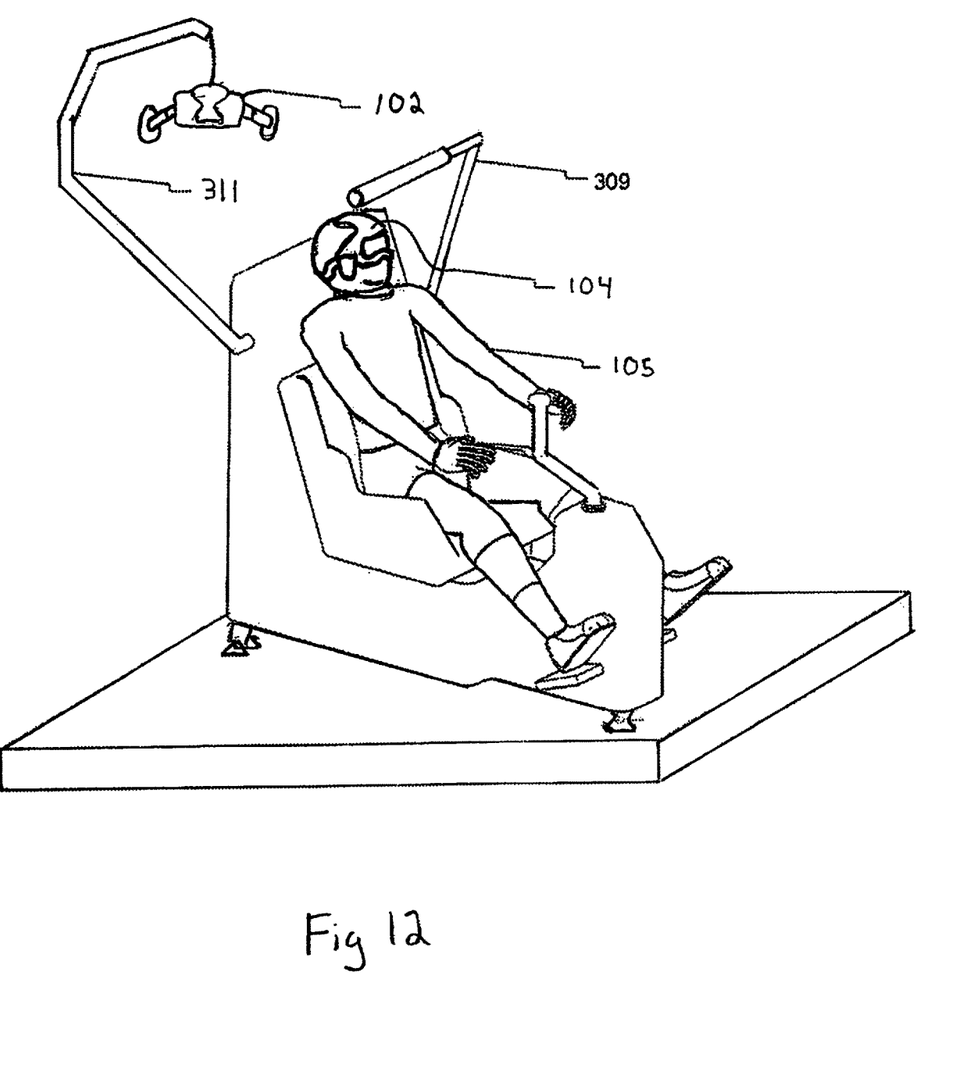
FIG. 12 is a perspective view of a schematic representation of the motion base assembly embodiment of FIG. 10 shown with a user, and an audio-visual component 102 and headpiece 104 disengaged one from the other.

FIG. 12 illustrates an open position of the motion base 301. Open position is configured to allow a user 105 to enter and exit the chair 305. The user 105 is entirely supported by the motion base 301 as the user 105 sits in the chair 305 and places their feet on the footrests. As illustrated in FIG. 12, when the engaging motion base 301, the user is wearing a headpiece 104 on the user's head. The user 105 straddles the input system 307. In the open position the audio-visual component support system 311 locates audio-visual component 102, over and behind the user's head.

Audio-visual component 102 is tethered to and supported by audio-visual component support system 311. In the open position, the restraint system 309 is also located above the user's head. As the user 105 pulls down on the restraint system 309 the audio-visual component support system 311 pivots down and locates the audio-visual component 102 in front of the user's face. The user 105 grasps the audio-visual component 102 and couples the audio-visual component 102 to the headpiece 104 and brings the speaker bodies 206 into contact with the ear guards 251, 252, to form the headset 100.

The system is configured such that the end of the hanger moves from in front of and above the user in an initial position to above and behind the initial position in a subsequent position. The system moves the hanging display from a location proximate the user's head to a location further away. Moving the display between locations or positions provides easy access to the motion base without users hitting their heads and damaging the displays. While the proximate location illustrated is in front of the user's head it should be apparent that the proximate location may be on the side of the user's head or just above the user's head. The non-proximate location is any location where the user can enter the motion base freely without interference from the display.

Figure 13:
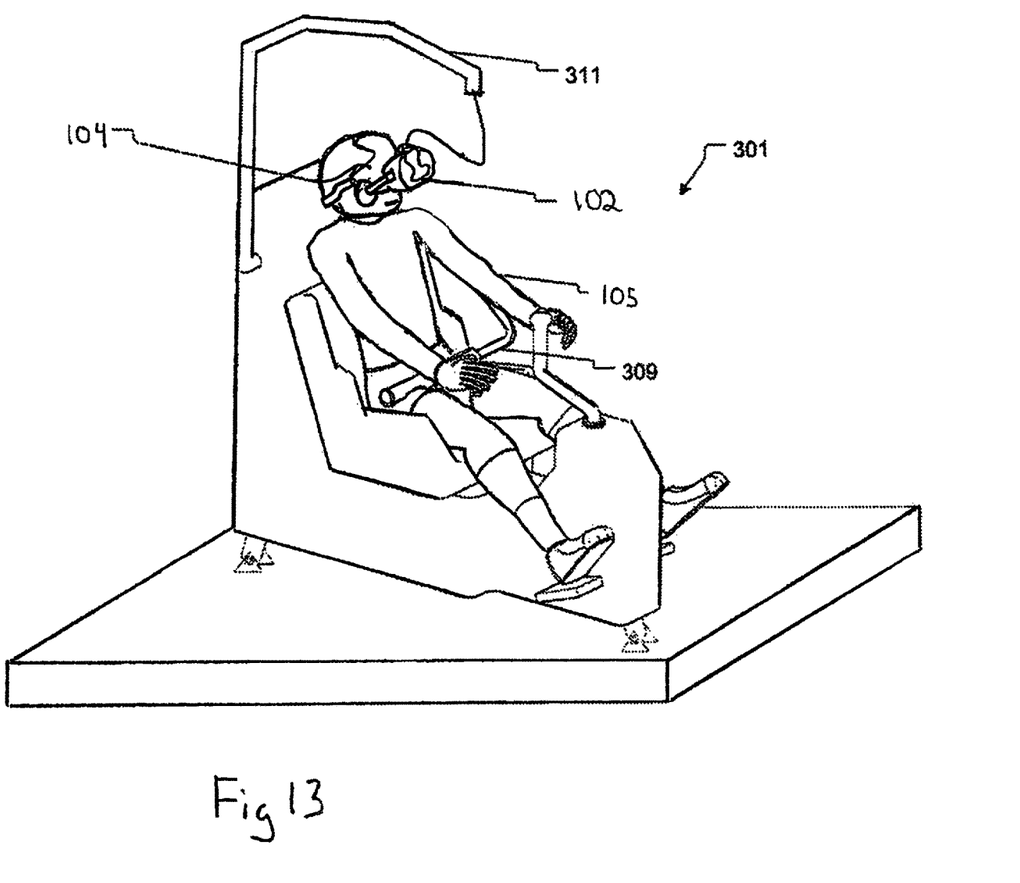
FIG. 13 is a perspective view of a schematic representation of the motion base assembly embodiment of FIG. 10 shown with a user, and an audio-visual component 102 engaged with a headpiece 104.

Once the ride is over, the audio-visual component 102 is decoupled from the headpiece 104 by the user 105. In the exemplary embodiment, user manipulation of the audio-visual component 102 to decouple if from the headpiece 104, causes the speaker bodies 206 to disengage from the ear guards 251, 252. Next the restraint system 309 is released by an operator. The user 105 then pulls up on the restraint system 309 and the audio-visual component support system 311 pivots up and behind the user 105. Once the user 105 exits the ride, the headpiece 104 is removed and is washed/ disinfected to be ready for subsequent use.

While the system described above is configured for an amusement attraction, it should be apparent that the system alternatively could be configured for a gaming system and or a flight simulator. Both military and civilian use of the system provides virtual reality providers with quicker turn-around and higher usage of the equipment than conventional virtual reality systems. Additionally, the system comprising a two piece virtual reality headset and motion base is configurable for locations where groups of users are exposed to virtual reality environments, such as in amusement parks, theme parks, carnivals, exhibitions, tours, traveling exhibitions, orientation centers, fairs, museums, family entertainment centers (FEC's), driving simulators, and flight simulators.

The scope of the claims should not be limited by the preferred embodiments set forth in the examples, but should be given the broadest interpretation consistent with the description as a whole.

What is claimed is:

1. A headset assembly for providing individualized video and audio to a user, the headset assembly comprising:
 a headpiece having: a view opening, a left ear guard and a right ear guard; wherein when the headpiece is in an operational position on the user's head, the view opening is at the user's eyes, the left ear guard is adjacent to the user's left ear and the right ear guard is adjacent to the user's right ear;
 an audio-visual component configured for interconnection with a video source and an audio source, and having a video display;
 a left audio speaker and a right audio speaker supported by the audio-visual component;
 a coupling means for releasably coupling the headpiece and audio-visual component, wherein when the headpiece and audio-visual component are so coupled:
  the view opening is adjacent the video display;
  the left audio speaker is reversibly movable between a left engaged position in which the left audio speaker is adjacent the left ear guard, and a left disengaged position in which the left audio speaker is laterally displaced from the left ear guard;
  the right audio speaker is reversibly movable between a right engaged position in which the right audio speaker is adjacent the right ear guard, and a right disengaged position in which the right audio speaker is substantially laterally displaced from the right ear guard; and
 wherein, when the headpiece and audio-visual component are so coupled and the left audio speaker is in the left engaged position and the right audio speaker is in the right engaged position, substantially anterior movement of the audio-visual component relative to the headpiece so as to decouple one from the other, causes the audio speakers to move to the disengaged positions.

2. The headset assembly of claim 1, wherein:
 when each audio speaker is in the engaged position, the engaged position is releasably maintained by a magnetic force of attraction between the audio speaker and the adjacent ear guard; and
 the substantially anterior movement of the audio-visual component relative to the headpiece weakens the magnetic force of attraction.

3. The headset assembly of claim 2, wherein associated with each audio speaker there is a biasing means tending to cause the audio speaker to move to the disengaged position wherein the biasing means is insufficient to cause the audio speaker to move from the engaged position when the headpiece and audio-visual component are coupled.

4. The headset assembly of claim 3, wherein:
 the support of each of the left audio speaker and the right audio speaker by the audio-visual component is provided by:
  a headphone arm having a proximal end and a distal end;
  a pivot mount, pivotally mounting the proximal end to the audio-visual component; and
  a headphone mount supporting the audio speaker at the distal end; and
 the biasing means comprises a spring assembly engaging the proximal end and the pivot mount.

5. The headset assembly of claim 4, wherein the headpiece further comprises two posterior facing sloped shoulders, one sloped shoulder anterior the left ear guard and the other sloped shoulder anterior the right ear guard, for assisting each audio speaker to move to the disengaged position under the substantially anterior movement of the audio-visual component relative to the headpiece so as to decouple one from the other.

6. The headset assembly of claim 5, wherein each posterior facing sloped shoulder is concave in profile.

7. The headset assembly of claim 1, wherein the coupling means for releasably coupling the headpiece and audio-visual component, comprises mating magnetic components.

8. The headset assembly of claim 7, wherein the mating magnetic components comprise:
   headpiece right, left and forehead magnets; and
   audio-visual component right, left and forehead magnets.

9. The headset assembly of claim 1, wherein the audio-visual component comprises:
   a head-mounted display device having the video display; and
   an adapter to which the head-mounted display device is secured, wherein, the support of each of the left audio speaker and the right audio speaker by the audio-visual component is provided by:
      a headphone arm having a proximal end and a distal end;
      a pivot mount, pivotally mounting the proximal end to the adapter; and
      a headphone mount supporting the audio speaker at the distal end.

10. The headset assembly of claim 9, wherein the adapter comprises an adapter body and a clamshell component, and the head-mounted display device is secured between the adapter body and the clamshell component.

11. An amusement attraction involving providing individualized video and audio to a user, the amusement attraction comprising:
   a headpiece having: a view opening, a left ear guard and a right ear guard, wherein when the headpiece is in an operational position on the user's head, the view opening is at the user's eyes, the left ear guard is adjacent to the user's left ear and the right ear guard is adjacent to the user's right ear;
   an audio-visual component configured for interconnection with a video source and an audio source, and having a video display;
   a left audio speaker and a right audio speaker supported by the audio-visual component;
   a coupling means for releasably coupling the headpiece and audio-visual component, wherein when the headpiece and audio-visual component are so coupled:
      the view opening is adjacent the video display;
      the left audio speaker is reversibly movable between a left engaged position in which the left audio speaker is adjacent the left ear guard, and a left disengaged position in which the left audio speaker is laterally displaced from the left ear guard;
      the right audio speaker is reversibly movable between a right engaged position in which the right audio speaker is adjacent the right ear guard, and a right disengaged position in which the right audio speaker is substantially laterally displaced from the right ear guard; and
      wherein, when the headpiece and audio-visual component are so coupled and the left audio speaker is in the left engaged position and the right audio speaker is in the right engaged position, substantially anterior movement of the audio-visual component relative to the headpiece so as to decouple one from the other, causes the audio speakers to move to the disengaged positions;
   a motion base, comprising a hanger, configured to support the audio-visual component over the user's head; and
   wherein the audio-visual component is tethered to the hanger.

12. The amusement attraction of claim 11, wherein the motion base further comprises a restraint system.

13. The amusement attraction of claim 11, wherein the motion base further comprises a control input and a plurality of actuators.

\* \* \* \* \*